United States Patent

[11] 3,581,196

[72] Inventor William L. Spaid
R.R. #1, South River Road, Cedarville, Ohio 45314
[21] Appl. No. 771,026
[22] Filed Oct. 28, 1968
[45] Patented May 25, 1971

[54] DIGITAL CAPACITANCE METER BY MEASURING CAPACITOR DISCHARGE TIME
6 Claims, 6 Drawing Figs.

[52] U.S. Cl. .................................................. 324/60R, 324/68
[51] Int. Cl. ............................................. G01n 11/52
[50] Field of Search ........................................ 324/60, 68

[56] References Cited
UNITED STATES PATENTS
3,229,201 1/1966 Curtis et al. ................... 324/68
3,370,229 2/1968 Hamburger et al. ........... 324/60

Primary Examiner—Edward E. Kubasiewicz
Attorneys—Harry A. Herbert, Jr. and James S. Shannon ABSTRACT: A fully automatic capacitance meter with decimal readout. The meter operates cyclically at a relatively high frequency, acting in an initial small fraction of each cycle to charge the unknown capacitor to a predetermined voltage, discharge the capacitor at a constant rate to zero voltage, measure the time interval required for discharge to produce a time analog of the capacitance, and convert the time analog to a decimal number. The remaining large fraction of each cycle is used to display the decimal number. Automatic range switching is accomplished by changing the discharge rate.

INVENTOR.
WILLIAM L. SPAID
BY Harry A. Herbert Jr
ATTORNEY
James S. Shannon
AGENT INVENTOR.
WILLIAM L. SPRIG
BY Harry A. Herbert Jr.
ATTORNEY
James S. Shannon
AGENT

DIGITAL CAPACITANCE METER BY MEASURING CAPACITOR DISCHARGE TIME

BACKGROUND OF THE INVENTION

The invention relates to electrical instruments, particularly capacitance measuring instruments. At the present time the accurate measurement of capacitance is usually done on a capacitance bridge. This is a slow process and requires a skilled operator since the bridge must be precisely balanced and accurately read. These requirements make the bridge method unsuitable for production testing or for field maintenance purposes. Measuring systems that require no adjustments by the operator or any particular skill have generally lacked accuracy.

SUMMARY OF THE INVENTION

The principal object of the invention is to provide a fully automatic digital capacitance meter, including automatic range switching, that has a high degree of accuracy yet requires no more from the operator than the connection of the unknown capacitor between two terminals provide for the purpose. Further objects of the invention are the production of a voltage ramp starting at a precise voltage below ground potential and ending at a precise voltage very slightly above ground potential, and the production of an accurate time analog of the capacitance of an unknown capacitor, the latter apparatus including the ramp generator.

Briefly, the digital capacitance meter is a system that operates cyclically at a relatively high frequency, acting in an initial small fraction of each cycle to charge the unknown capacitor to a predetermined voltage, discharge the capacitor at a constant rate to zero voltage, measure the time interval required for discharge to produce a time analog of the capacitance, and convert the time analog to a decimal number. The decimal number is produced by a counter which counts the pulses from a constant frequency pulse source that pass a gate opened for the interval of the time analog. Automatic range switching is accomplished by changing the rate of capacitor discharge after a full count has been reached in the counter. The production of the voltage ramp is accomplished by connecting one terminal of the capacitor, termed the low potential terminal, to ground through a diode and to a source of potential through a constant current device. Current flow from the constant current source through the diode to ground establishes the low potential terminal at a slight voltage above ground equal to the forward diode drop. The other or high potential terminal of the capacitor is connected through a resistor to a source of predetermined constant potential permitting the capacitor to charge to this potential. The ramp is initiated by lowering the high potential terminal of the capacitor to ground potential which lowers the low potential terminal an equal amount so that its potential is now below ground and the diode is nonconductive. The capacitor then discharges at a constant rate through the constant current source, the resulting linearly rising voltage of the low potential terminal constituting the ramp. This continues until the diode again becomes conductive and the initial conditions are reestablished. To produce the time analog, a voltage comparator having one input connected to the low potential terminal of the capacitor and the other to ground and using ground as the reference potential produces a rectangular pulse having leading and trailing edges coincident, respectively, with the instant the low potential terminal drops below ground potential and the instant this terminal reaches ground potential due to capacitor discharge. The duration of this pulse is the time analog of the capacitance.

DESCRIPTION OF THE PREFERRED EMBODIMENT

The change in voltage across a capacitor produced by a constant rate of charge transfer in a given time interval is given by the expression:

(1)
$$V = \frac{I}{C} t$$

where $t =$ the time interval in seconds
$C =$ the capacitance in farads
$I =$ the constant rate of charge transfer in coulombs per second or amperes
$V =$ the difference between the capacitor voltages at the start and end of interval $t$.

This expression may be rewritten as:

(2)
$$C = \frac{I}{V} t$$

and, if $I$ is a constant current and $V$ is a specified constant voltage change, equation (2) may be written as:

(3)     $C = Kt$.

The digital capacitance meter described herein determines $t$ as an analog of an unknown $C$ in accordance with equation (3) and converts this analog to a digital representation of the value of $C$.

Figure 1:
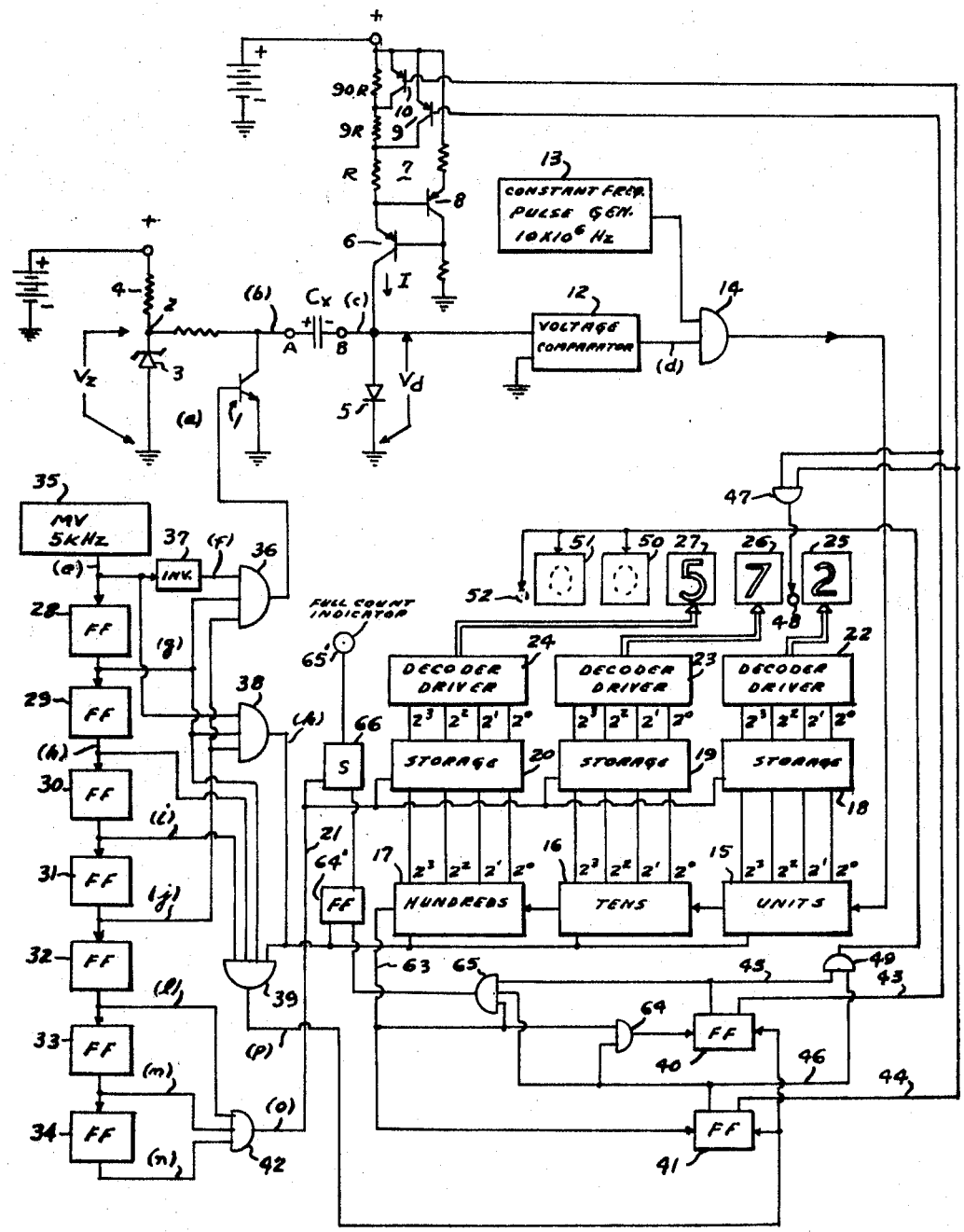
FIG. 1 is a schematic diagram of the capacitance meter.

Referring to FIG. 1, the unknown capacitor $C_x$ to be measured is connected between terminals A and B. The associated circuit first charges $C_x$ to a predetermined voltage $V$ and then determines the interval $t$ required for $C_x$ to discharge at a constant predetermined rate to a voltage of zero. This operation is under the control of a rectangular voltage wave ($a$), shown in FIGS. 2 and 3, which is applied to the base of transistor 1. The generation of this wave will be described later.

When the voltage wave ($a$) is low, i.e. during the intervals W and Y of this wave, transistor 1 is nonconductive and the voltage $V_z$ between point 2 and ground, held constant at all times by the voltage regulator circuit consisting of zener diode 3 and resistor 4, causes capacitor $C_x$ to charge through diode 5 to a voltage $V$ such that $V+V_d=V_z$. At this time a constant current $I$ from the collector of transistor 6 is flowing through diode 5 to ground establishing a small forward voltage drop $V_d$ across this diode. Transistor 6 is part of a constant current source 7 comprising the transistor amplifying stage 8 and the emitter resistor of transistor 6 which may have a value of R, 10R or 100R depending upon the range selected, as will be explained later. Any tendency for current $I$ to change in value produces a change in potential across the emitter resistor of transistor 6 which is applied as an input signal to the base of transistor 8. This transistor has its collector directly coupled to the base of transistor 6 and operates in response to the input signal to change the base potential in the proper sense to oppose the change in $I$. The value at which $I$ is held constant depends upon the value of the transistor 6 emitter resistance which is controlled, in a manner to be described later, by range switching transistors 9 and 10.

Figure 2:
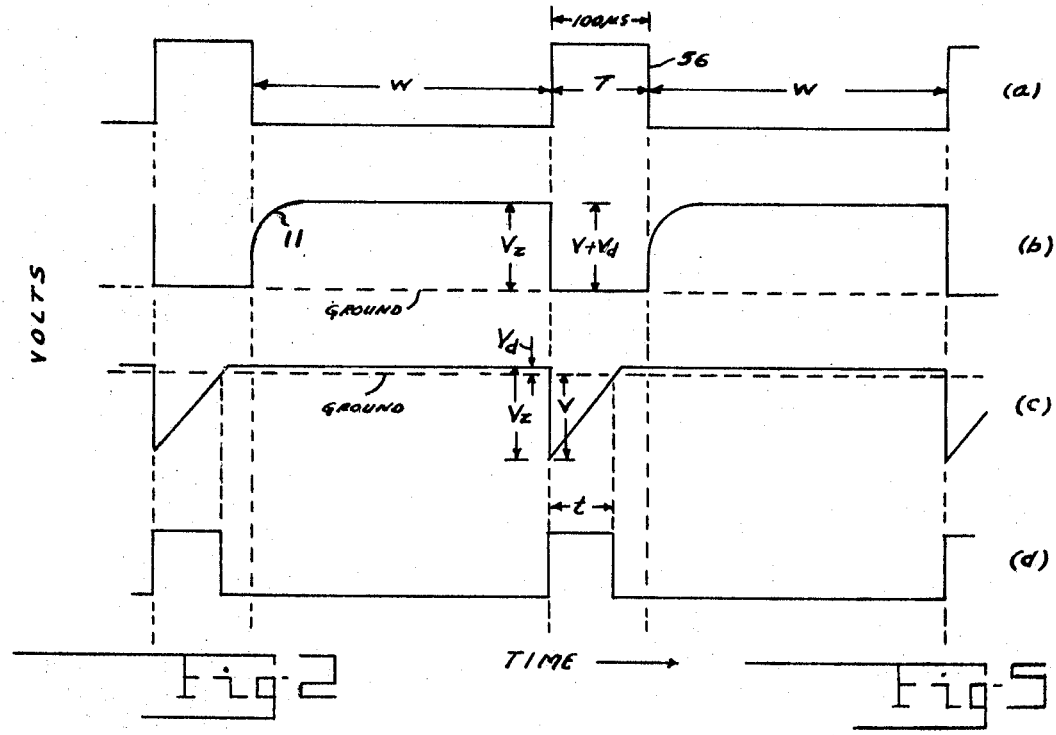
FIGS. 2, 3 and 4 are waveforms occurring in the system of FIG. 1.

The waveform ($b$) in FIG. 2 represents the voltage at terminal A, the above-described charging of $C_x$ being illustrated by potion 11 of this wave. At the end of portion W of wave ($a$) its voltage abruptly increases to a higher value which is maintained for an interval T. This produces full conduction in transistor 1 effectively clamping terminal A to ground potential as shown by wave ($b$). Since the potential $V$ to which capacitor $C_x$ has been charged can not change instantly, terminal B at the start of interval T drops in potential by the same amount as terminal A. Therefore, terminal B, which had a small potential $V_d$ above ground at the end of interval W, drops from this potential to a potential $V$ below ground, or a total drop of $V_z=V+V_d$, the same as for terminal A. The drop of terminal B below ground potential cuts off diode 5 so that the constant current $I$ from source 7 now flows through $C_x$ and transistor 1 to ground. This constitutes in effect a discharge of $C_x$ at a constant rate so that the capacitor voltage decreases linearly with time from its initial value V. This causes the potential of terminal B to rise linearly toward ground potential as illustrated by wave (c) of FIG. 2 which shows the voltage variation of terminal B.

The potential at terminal B is applied to one input of voltage comparator 12 the other input of which is connected to ground as the reference potential. The voltage comparator is a circuit having at any time one of two possible output levels depending upon the potential of terminal B relative to the reference potential ground. In the application shown, the circuit may be of any design in which the higher output level is present whenever the potential of B is lower than a potential lying between ground and a voltage V below ground but preferably as close as possible to ground, and the lower output level is present whenever the potential of B is above ground. With this arrangement, voltage comparator 12 generates a pulse having a duration $t$ equal to the time required for terminal B to rise in potential from a value V below ground to ground potential, or, in other words, the time required for $C_x$ to discharge from a potential V across its terminals to zero potential across its terminals. The output of the voltage comparator 12 is illustrated by wave (d) of FIG. 2.

If V and I are established constant quantities, then $t$, as shown by equations (2) and (3), is an analog of $C_x$. An analog-to-digital converter is used to indicate the magnitude of $C_x$ as a decimal number. For this purpose a constant frequency pulse generator 13 supplies pulses to AND gate 14 to which the output of comparator 12 is applied as a gating pulse. The number of pulses passing gate 14 during the time interval defined by the gating pulse is therefore proportional to $t$ and consequently to $C_x$. These pulses are counted and displayed by a decimal counter.

The decimal counter shown in FIG. 1 is restricted for simplicity to three decades as represented by the BCD (binary coded decimal) decade counters 15, 16, and 17, the pulse output of gate 14 being applied to the units decade 15. Each counter produces on its four output lines binary numbers corresponding to the digits 0—9, the 10th pulse received producing the zero output and generating a carry to next decade. Counters of this type are well known in the art and described in the literature, an example being the Texas Instrument SN7490 decade counter. Storage devices 18, 19, and 20 are provided to store the outputs of counters 15, 16, and 17 for reasons that will be apparent later. These devices are controlled simultaneously by voltages on line 21, the operation being such that when the line 21 voltage is high the storage devices follow the binary coded decimal output of the associated counters, and when the control voltage is low the devices store the information present at the time of transition. Storage devices of this type are also well known in the art and are available commercially, an example being the Texas Instrument SN5475/7475 quadruple latch, Finally, the decoder-driver circuits 22, 23, and 24 decode the binary coded decimal outputs of the storage devices and actuate the decimal indicators 25, 26, and 27. Decoder-driver circuits are also well known and available commercially, an example being the Texas Instrument BCD-to-decimal decoder-driver SN5441/7441. Any suitable decimal display device may be used such as the familiar gas-filled readout tubes.

Figure 3:
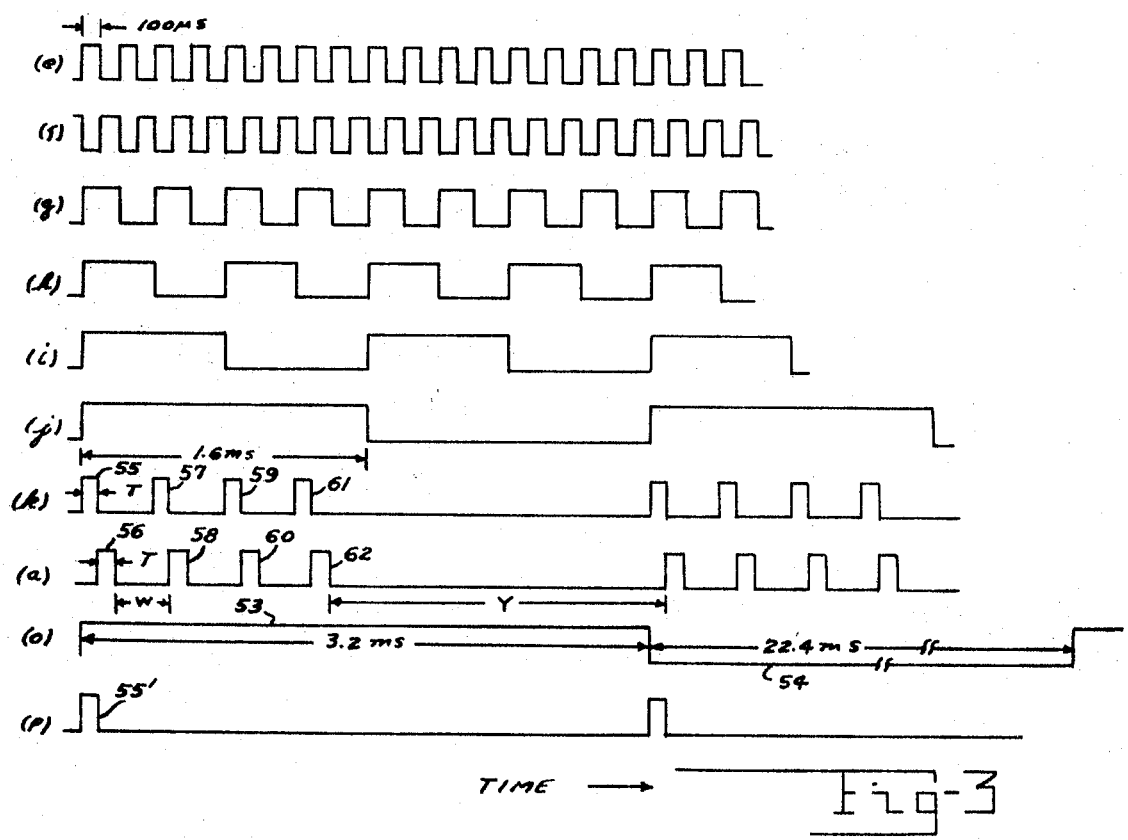

The various steps in the operation of the described digital capacitance meter are programmed by rectangular voltage waves (a), (k) and (o), shown in FIG. 3, which always have a fixed relation to each other and are derived from a cascade of seven bistable or flip-flop (FF) circuits designated by reference numerals 28—34. This cascade is driven by a square wave of 5000Hz, derived from free running multivibrator 35 and illustrated by wave (e) in FIG. 3.

The wave (a), which is applied to the base of transistor 1, is derived from AND gate 36 which has as its input wave (f), the inverse of wave (e) derived from inverter 37, wave (g) from the output of FF28, and wave (j) from the output of FF31. The purpose of wave (a), which is also shown on an expanded time scale in FIG. 2, has already been explained. The duration of the high portions of wave (a) is one half the period of wave (e) or, in the example given, 100μs.

The wave (k) is derived from AND gate 38 which has as its inputs wave (e) from multivibrator 35, wave (g) from FF28, and wave (j) from FF31. The pulses of wave (k), also of 100μs duration, occur immediately prior to those of wave (a) and serve to reset the decade counters 15, 16, and 17 to zero.

The first pulse in each reset of four pulses in the wave (k) is selected by gate 39 which receives as inputs the wave (k) from gate 38, the wave (g) from FF28, the wave (h) from FF29, and the wave (i) from FF30. The selected pulses result in wave (p), illustrated in FIG. 3, the purpose of which is to reset memory FF's 40 and 41 at the start of each cycle of operation as will be explained later.

Figure 4:
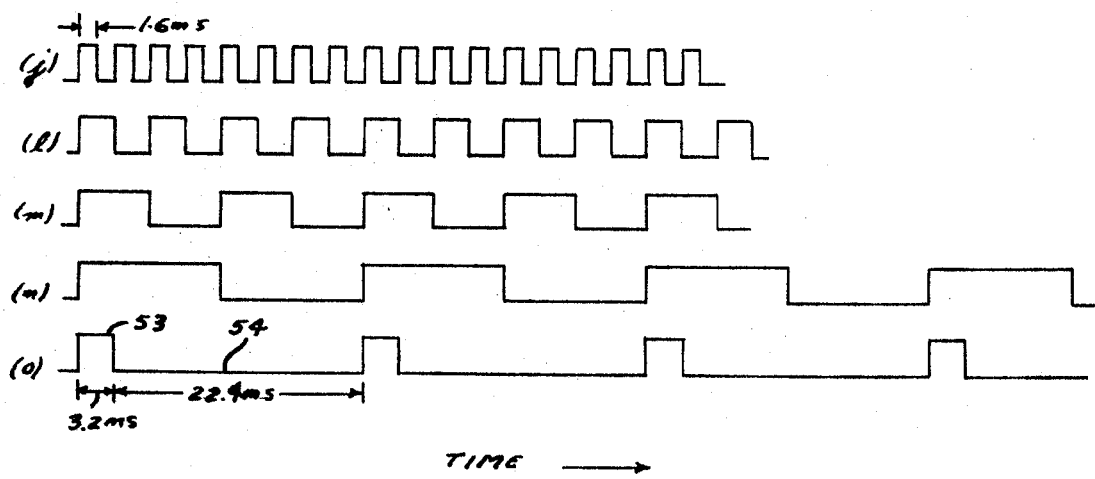

The wave (o) is derived from AND gate 42 which has wave (l) from the output of FF32, wave (m) from the output of FF34 applied as inputs. The waves are illustrated in FIG. 4 on a time scale contracted to one-sixteenth that of FIG. 3, the waves (j) and (o) being repeated from FIG. 3 on the contracted scale. In the example given, the duration of the high portion of wave (o) is 3.2 milliseconds and the duration of the low portion is 22.4 milliseconds. The purpose of wave (o) is to control the storage devices 18, 19, and 20 and its period of 25.6 milliseconds is the period of one complete cycle of operation of the system of FIG. 1.

Referring again to FIGS. 1 and 2 and to the production of the analog $t$ of $C_x$ as described, the largest value of $C_x$ that can be measured for any given values of V, I and T is that value for which $t=T$. Since 1000 pulses from source 13 pass through gate 14 during the interval T, the accuracy of measurement is $$\pm \frac{C_{x(max)}}{1,000}$$

The range may be changed by changing V, I, T, or any combination of these parameters. In the example shown in FIG. 1, three ranges are provided by providing for three values of the constant current I with the values of V and T held constant. For this purpose the emitter resistor of transistor 6 in the constant current source is in three series sections having values of R, 9R and 90R. The effective value of the emitter resistance is controlled by shorting transistors 9 and 10. Biasing transistors 9 and 10 to the nonconductive state at their bases produces the highest emitter resistance 100R and the lowest value of I or $I_{min}$. With transistor 10 conductive and transistor 9 nonconductive, the emitter resistor is 10R and I=10$I_{min}$. With both transistors conductive, the emitter resistor has the value R and I= 100$I_{min}$. The following is a specific example for the system of FIG. 1:

F (source 13) =10 megahertz
V =10 volts
T =100 microseconds
R =value required to make I=1mA with 9R and 90R shorted.

I:                                     $C_x$
10μA ———————————— 0-99. 9 pf.±. 1 pf.
100μA ———————————— 100-999 pf.±1 pf.
1mA ————————. 00100-. 00999 μf.±. 0001 μf.

The transistors 9 and 10 are controlled by memory FF's 40 and 41 of the automatic range changing circuits, the operation of which will be explained later. When the FF's are in one of their two stable states, which will be designated the reset state, the voltages on lines 43 and 44 are high and the voltages on lines 45 and 46 are low, and when in the other of their two stable states, which will be designated the set state, the voltages on lines 43 and 44 are low and the voltages on lines 44 and 46 are high. In the lowest range, both FF's are reset, transistors 9 and 10 are both nonconductive so that I has its minimum value of 10 microamperes, there is an output from AND gate 47 (since lines 43 and 44 are both high) which energizes decimal point indicator 48, and the decimal indicator reads to a maximum of 99.9 picofarads. In this case AND gate 49 has no output, since lines 45 and 46 are both low, and zero indicators 50 and 51 and decimal point indicator 52 are not energized. In the intermediate range, FF40 remains reset but FF41 is set, transistor 9 remains nonconductive but transistor 10 is conductive so that $I$ has its intermediate value of 100 microamperes, there is no output from gate 47 (since line 44 is now low) so that decimal point indicator 48 is not energized, and the decimal indicator reads to a maximum of 999 picofarads. As in the lowest range, indicators 50, 51, and 52 remain deenergized since there is no output from AND gate 49 due to the low potential remaining on line 45. Finally, in the highest range, both FF40 and FF41 are set, transistors 9 and 10 are conductive so that $I$ has its maximum value of 1 milliampere, there is no output from gate 47 but there is an output from gate 49 energizing indicators 50, 51, and 52, and the decimal indicator reads to a maximum of 0.00999 microfarads.

One complete cycle of operation of the system of FIG. 1, including the operation of the automatic range changing circuits, is as follows: As stated earlier, the period of one complete cycle of operation corresponds to the period of wave ($o$), or 25.6 milliseconds in the example given. As seen in FIGS. 3 and 4, the period of this wave is divided into a first higher voltage portion 53 of 3.2 milliseconds duration and a second lower voltage portion 54 of 22.4 milliseconds duration. The cycle of operation begins with the positive-going leading edge of portion 53 and the first event in the cycle is the resetting of BCD counters 15, 16, and 17 to zero by pulse 55 of wave ($k$). Pulse 55 also passes through gate 39, becoming pulse 55' of wave ($p$), and is applied to FF40 and FF41 resetting these memory devices to the states in which lines 43 and 44 have their higher potentials, which establishes $I$ at its minimum value of 10 microamperes and places the device in its lowest measuring range as already explained.

Following pulse 55 the first pulse 56 of wave ($a$) occurs. During the interval $T$ of this pulse, which in the example given is 100 microseconds, the potential of terminal B rises linearly toward ground potential as illustrated in wave ($c$) of FIG. 2 and as already explained. If terminal B reaches ground potential before the 1000pulse passes through gate 14 the decade counters no range switching occurs and the operation of the circuit for the pulses 55—56 is repeated for each of the remaining pairs of pulses 57—58, 59—60, and 61—62, with the exception that pulses 57, 59 and 61 of wave ($k$) do not pass gate 39, as shown by wave ($p$), and FF's 40 and 41 remain in the state in which they were placed by pulse 55'. Since BCD storage devices 18, 19 and 20 follow the count in decades 15, 16, and 17 during portion 53 of wave ($o$), the count recorded during pulse 62 is displayed by the decimal indicators for the remainder of portion 53 of wave ($o$) and the entire portion 54 of this wave. Although the pulses of waves ($k$) and ($a$) that occur during portion 54 of wave ($o$) accomplish the same results in the circuit as the pulses that occur during portion 53, the display is not affected since the storage devices are insensitive to the counter outputs when the voltage wave ($o$) has its lower value. Therefore, the count recording during the pulse 62 is displayed until the end of portion 54, or for slightly more than 22.4 milliseconds out of the total cycle period of 25.6 milliseconds.

If during the interval $T$ of pulse 56 the terminal B does not reach ground potential before the 1000th pulse passes gate 14, then the 1000th pulse changes the 999 count in the decades 15, 16, and 17 to zero and produces a carry pulse from the hundreds decade 17 which is applied over line 63 to FF41, to AND gate 64, and to AND gate 65. Since lines 45 and 46 are low in potential at this time, the carry pulse does not pass either gate 64 or gate 65, however, it sets FF41 lowering the potential on line 44 and raising it on line 46. With FF41 set but FF40 remaining reset, $I$ has its intermediate value of 100 microamperes and decimal point indicator 48 is deenergized, as already explained, so that the system is switched to its intermediate range.

The system now makes a second measurement of $C_x$ at the intermediate range during the interval $T$ of pulse 58, the pulse 57 insuring that the decade counters are at zero before the start of the interval. If the terminal B now reaches ground potential before the 1000th pulse has passed gate 14 the operation of the circuit for the pulses 57—58 is repeated for each of the remaining pairs of pulses 59—60 and 61—62, the count recorded during pulse 62 being displayed for the remainder of the cycle of wave ($o$).

If, on the other hand, terminal B, during the interval $T$ of pulse 58, does not reach ground potential before the 1000th pulse passes gate 14, the 1000th pulse produces a carry pulse on line 63 as before. Since the potential of line 46 is now high (FF41 set), the carry pulse passes gate 64 to FF40 but still does not pass gate 65 since line 45 is still low (FF40 reset). The carry pulse passing gate 64 sets FF40 and, with both FF40 and FF41 set, the system is in its high range with $I$=1 milliampere and indicators 50, 51, and 52 energized, as already explained.

The system now makes a third measurement of $C_x$ at the high range during the interval $T$ of pulse 60, pulse 59 insuring that the decades are reset to zero before the start of the interval. As before, if terminal B now reaches ground potential before the 1000th pulse passes gate 14 the operation of the circuit for pulses 59—60 is repeated for pulses 61—62, the count recorded during pulse 62 being displayed for the remainder of the cycle of wave ($o$).

However, if terminal B still fails to reach ground potential before the 1000th pulse passes gate 14, the carry output from hundreds decade 17 produced by the 1000th pulse passes gate 65 (lines 45 and 46 now both being high) and sets FF64' to the one of its two stable states in which full count indicator light 65' is energized through the agency of storage device 66. This device is similar to storage devices 18, 19, and 20 except for the number of stages and is controlled by wave ($o$), acting during portion 53 of wave ($o$) to follow FF64' and during portion 54 to store the state FF64' had when the transition between the two portions occurred. Although next occurring pulse 59 of wave ($k$) resets FF64' to the indicator light 65' "off" state, it is again set to the "on" state in the above-described manner during pulse 62 and this state is retained by storage device 66 for the remainder of the cycle. Therefore, if $C_x$ is larger than the capabilities of the measuring system an indication of this fact is given by light 65'.

The above-described complete cycle of operation of the system is repeated for each cycle of wave ($o$). Therefore, any errors that may have occurred in the first cycle, due to starting at an intermediate point in the cycle, can not persist for longer than 25.6 milliseconds, the period of wave ($o$).

Figure 6:
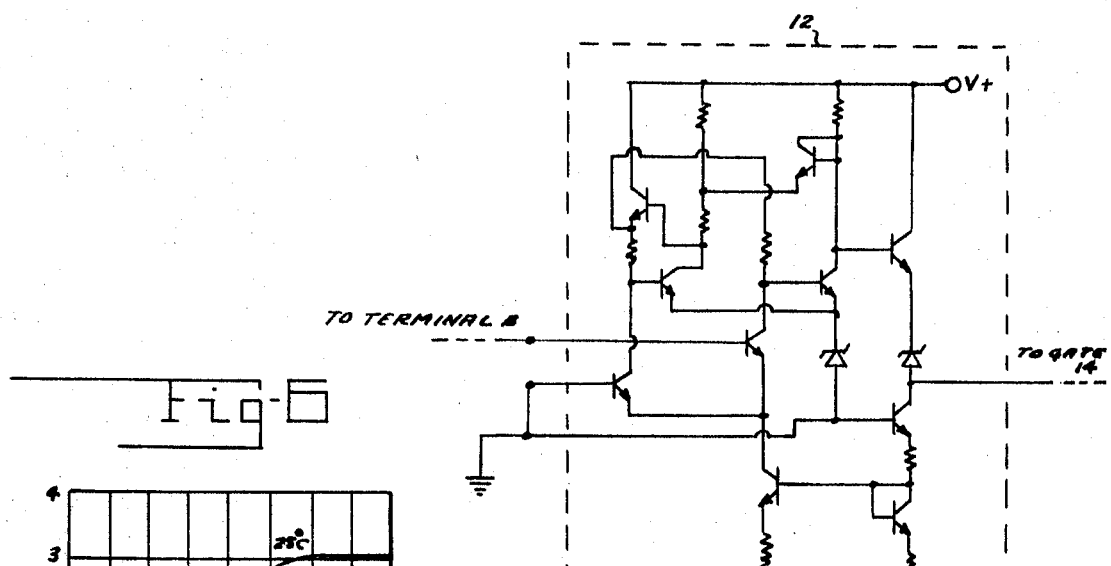
FIG. 6 shows the transfer function of the circuit of FIG. 5.
Figure 5:
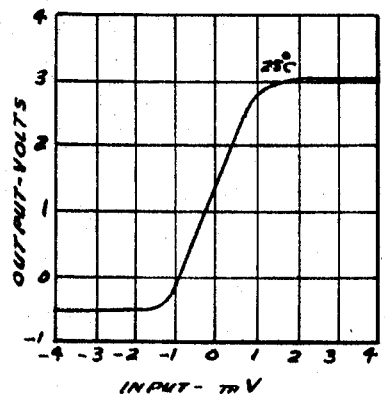
FIG. 5 is a schematic diagram of a suitable voltage comparator for use in the system of FIG. 1.

The voltage comparator 12 may be of any design capable of satisfying the above-stated requirements. Basically, the function of the circuit is to compare a signal voltage with a reference voltage, in this case ground potential, and produce one output voltage level when the signal is below the reference and another output voltage level when the signal is above the reference. The circuit may be fundamentally a Schmitt trigger or a high gain limited output differential amplifier. A high resolution rapidly responding circuit of the latter type suitable for use in FIG. 1 is commercially available from the Fairchild Semiconductor Division of Fairchild Camera and Instrument Corporation, 313 Fairchild Drive, Mountain View, California. This circuit is designated μA710C High-Speed Differential Comparator and is described in brochure SL-21, July 1965. A schematic diagram of the circuit is shown in FIG. 5. This circuit has a resolution of 5 millivolts, i.e. a 5 millivolts difference between input terminals is sufficient to switch output levels, and a response time of 40 nanoseconds. Its transfer characteristic is shown in FIG. 6.

I claim:

1. A digital capacitance meter comprising: means for charging an unknown capacitor to a known voltage; means including a constant current source for discharging said capacitor from said known voltage to a predetermined voltage lower than said known voltage at a constant predetermined rate; means for determining the interval of time required for said discharge to occur; and means for producing a numerical representation of said interval of time.

2. A digital capacitance meter comprising: means for charging an unknown capacitor to a known voltage; means including a constant current source for discharging said capacitor from said known voltage to a predetermined voltage lower than said known voltage at a constant predetermined rate; means for determining the interval of time required for said discharge to occur; a source of pulses having a constant repetition rate; a counter for counting the number of said pulses occurring during said time interval; means for displaying the count in said counter; mean for operating said capacitance meter cyclically; and range changing means coupled to said counter and to said constant current source an operative immediately following the occurrence of a full count in said counter to increase the value at which the discharge current is held constant.

3. Apparatus as claimed in claim 2 in which said constant current source comprises: a transistor the collector current of which is the discharge current of said capacitor, an emitter resistor in the emitter circuit of said transistor, a high gain circuit receiving the voltage across said emitter resistor as an input for controlling the base-emitter voltage of said transistor in such direction as to oppose any change in the emitter current and consequently in the collector current of said transistor; and in which said range changing means comprises: a plurality of taps, equal in number to the number of ranges, on said emitter resistor; separate normally open short circuiting means connected between each tap and one end of said resistor, the values of resistance between taps decreasing from said one end as required for the resistance of the unshorted portion of the resistor remaining after each shorting means is closed in succession, starting with the shorting means connected to the tap nearest the said one end of the emitter resistor, to be a fixed fraction of the resistance of the unshorted portion of the resistor before the shorting means closed; and means coupled to said counter and to said shorting means and operative immediately following the occurrence of each full count in said counter to close said shorting means in said succession.

4. Capacitance measuring apparatus comprising: terminals A and B between which an unknown capacitor may be connected; means providing a point of predetermined constant direct potential relative to a point of reference potential; a resistor connected between terminal A and said constant potential point; a diode connected between terminal B and said point of reference potential, said diode completing a charging circuit for said unknown capacitor between said point of constant potential and said point of reference potential and being poled so as to have its forward direction correspond to the direction of charging current flow; a two terminal source of direct current having one terminal connected to said point of reference potential; a constant current device connected between the other terminal of said direct current source and terminal B, said source and constant current device being poled to send current through said diode in the forward direction; a voltage comparator connected to terminal B and to said point of reference potential for comparing the potential of terminal B with said reference potential and producing an output voltage having one of two possible levels when the potential of terminal B is below the reference potential and the other of the two possible levels when above the reference potential; and means for connecting terminal A to said point of reference potential for a predetermined period, the duration of the rectangular pulse at the output of said comparator resulting from output level transitions during said period being the time analog of the capacitance of said unknown capacitor.

5. Apparatus as claimed in claim 4 and in addition: a source of pulses having a constant repetition rate; an AND gate to which said pulses and the output of said voltage comparator are applied as inputs; a counter coupled to the output of said AND gate for counting the number of pulses passing the gate; storage means coupled to said counter for storing the count; means coupled to the storage means for providing a numerical display of the stored count; means generating a periodic rectangular wave ($o$) having in each cycle an initial portion at one voltage level followed by a final portion at another voltage level, said initial portion being a small fraction of the total period of the cycle; means applying said wave ($o$) to said storage means for controlling its operation such that during the said first portion of said wave the storage means follows the count in the counter and during the said final portion stores the count that was present in the counter when the transition between first and second portions occurred; means generating a plurality of successive equally spaced rectangular pulses ($k$) during the first portion of each cycle of wave ($o$); means generating a number of equally spaced ($a$) pulses equal to the number of ($k$) pulses and each occurring after its corresponding ($k$) pulse; means applying said ($k$) pulses to said counter for resetting the counter to zero at each pulse; means applying said ($a$) pulses to the said means for connecting terminal A to said point of reference potential for effecting said connection for the duration of each ($a$) pulse; a plurality of bistable circuits each having a first and second stable states coupled to said constant current device for controlling the value at which the current is held constant, the arrangement being such that when all circuits are in their first state the current has its lowest value and actuation of said circuits to their second states successively in a prescribed order increases the current by a predetermined factor for each actuation; means for applying the first ($k$) pulse to occur in each cycle of said wave ($o$) to said bistable circuits for resetting them to their said first states; and means coupled to said counter and operative immediately after each full count to set said bistable circuits to their said second states, one for each full count and in said prescribed order.

6. Apparatus as claimed in claim 5 in which said constant current device comprises a transistor having its collector connected to said B terminal and its emitter connected through an emitter resistor to said source of direct current, and a high gain circuit receiving the voltage across said emitter resistor as an input for controlling the base-emitter potential of said transistor in such direction as to oppose any change in the emitter current and consequently in the collector current of said transistor; a plurality of taps, equal in number to the number of said bistable circuits, on said emitter resistor; separate normally open short circuiting means connected between each tap and one end of said resistor, the values of resistance between taps decreasing from said one end as required for the resistance of the unshorted portion of the resistor remaining after each shorting means is closed in succession, starting with the shorting means connected to the tap nearest the said one end of the emitter resistor, to be a fixed fraction of the resistance of the unshorted portion of the resistor before the shoring means was closed; and couplings between said bistable circuits and said shorting means for closing the shorting means when the associated bistable circuit is in its said second stable state.